United States Patent [19]

Della-Penna

[11] Patent Number: 5,209,369
[45] Date of Patent: May 11, 1993

[54] APPLICATION OF SEALANT MEMBRANE BY SPRAYING AND RESULTANT MEMBRANE

[75] Inventor: Domenico Della-Penna, Huntington Beach, Calif.

[73] Assignee: Rockwell International Corporation, Seal Beach, Calif.

[21] Appl. No.: 706,457

[22] Filed: May 28, 1991

[51] Int. Cl.$^5$ .................. B65D 90/08; B05D 7/22
[52] U.S. Cl. .................. 220/456; 427/236; 427/239
[58] Field of Search ........... 427/236, 239; 220/454, 220/456, 457

[56] References Cited

U.S. PATENT DOCUMENTS 4,552,281 11/1985 Schneider .................. 220/457 X

Primary Examiner—Evan Lawrence
Attorney, Agent, or Firm—Terrell P. Lewis; Charles T. Silberberg

[57] ABSTRACT

A sealant membrane for preventing leakage of fluids from fluid-containing tanks and a method of application of the membrane. The membrane is deposited in a varying thickness atop surfaces of interconnected wall panels in the tank by spray application of successive coats of a sealant material, so that the coating thickness is a maximum where the greatest structural deflections can occur. The successive coats are applied with a predetermined lapse time between layers to prevent slumping of the sealant material.

10 Claims, 1 Drawing Sheet

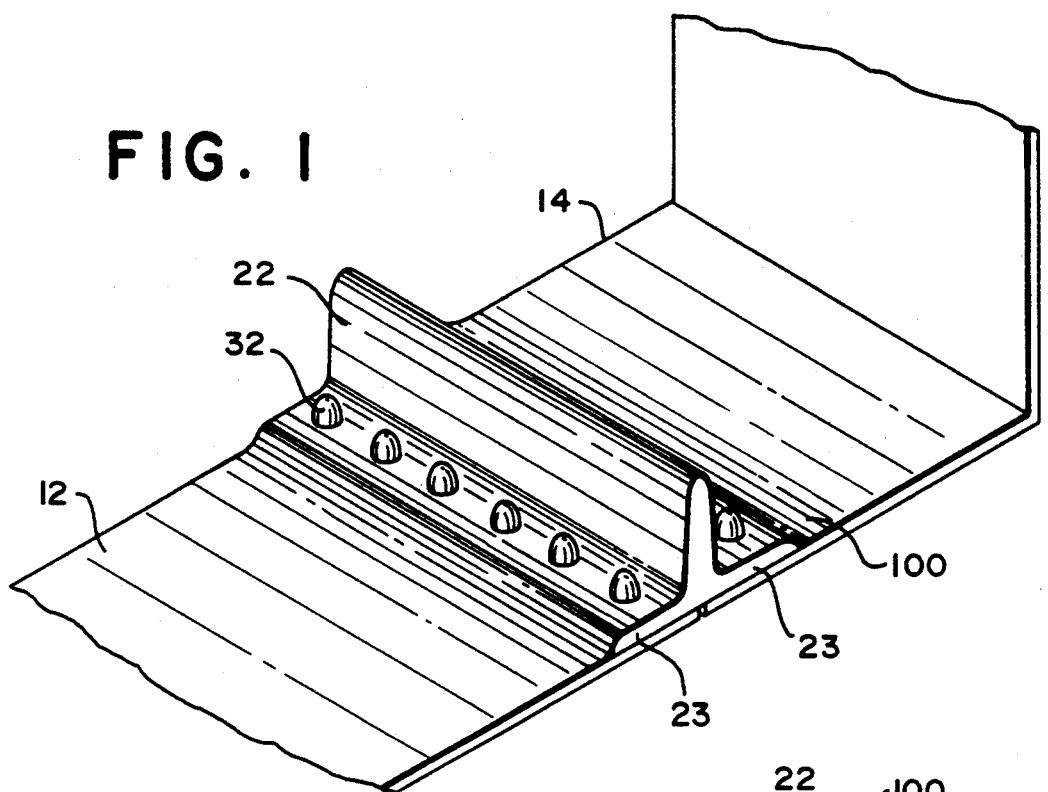
FIG. 1
FIG. 1a
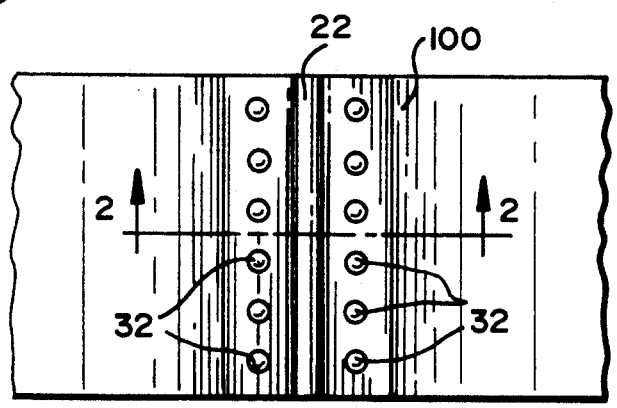
FIG. 2
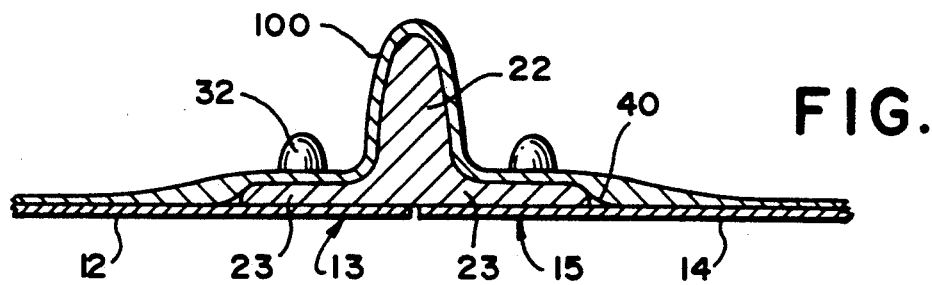
FIG. 3
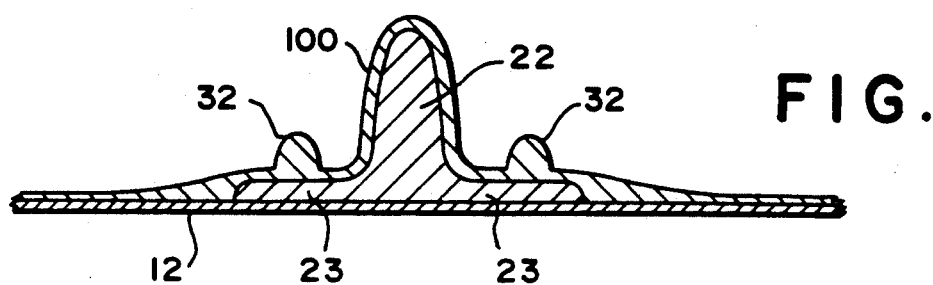

APPLICATION OF SEALANT MEMBRANE BY SPRAYING AND RESULTANT MEMBRANE

BACKGROUND OF THE INVENTION

1. Field of the Invention

The present invention relates to the application of sealants to fluid containment structures, and more particularly to sealing compositions and a method of application of such compositions to wall structure joints and connections so as to provide a fluid containment structure which is leak-proof and within which the sealing composition makes intimate contact with the contained fluid.

2. Background of the Invention

The use of sealant compositions to insure the integrity of fluid-retention properties of containers, and surfaces against which fluids are disposed, is well known in the art.

Typically, fluid containment tank structures include wall members of various configurations which are secured to one another with fastener systems. Thereafter, a sealing composition is applied to cover or "plug" leak-producing voids or spaces formed by gaps or excessive clearances between abutting wall surfaces, fasteners used in the fastener systems, and various mismatches in the materials used.

In fluid containment tanks of the type which carry fuels, in addition to maintaining leak-proof integrity of the structure, the sealing composition must be of a type which will resist deterioration due to chemical interaction with the fuel itself. In this connection, it is important that the sealing composition also be of the type which will accomodate various deflection cycles that occur in an aircraft.

Further, the sealing composition must be of a type which is easy to apply to, and cover, various surface configurations, especially those located in the most inaccessible places. Most typically, sealing compositions for use in sealing the interior surfaces of fuel containment tanks are applied via manual, as well as automated, techniques.

OBJECTS AND SUMMARY OF THE INVENTION

It is therefore an object of the present invention to provide a novel method of applying a sealing composition to interior surfaces of fuel containment tanks to provide a novel leak-preventing seal which overcomes all the deficiencies and disadvantages of known seals and sealing methods of like kind.

Another object of the present invention is to provide a novel sealing method for covering structural joints, such as joints between wall panels, barriers and stiffener members, in the interior of fuel containment tanks so that thin sealing membranes are formed with predetermined and controllably tapered thicknesses atop various overlapping or abutting surfaces of these structural components of the tank.

Still another object of the invention is to provide a seal configuration which can be formed on the interior surfaces of fuel containment tanks by so simple an apparatus as an ordinary spray gun.

Yet another object is the deposition of a thin, flexible membrane-like sealing composition on and over such surfaces as adjoining or abutting joint interfaces, fastener assembly connections, and wall surface cracks, holes, or imperfections.

These and other objects are accomplished by the fabrication of a seal atop one or more surfaces of interconnected enclosure wall panels which must be covered to prevent leakage of fluid contained within the enclosure. In particular, a tapered seal is deposited atop the interconnected wall panel or barrier surfaces in the areas of the joined elements by spray application of successive coats of sealing material. The successive coats are applied with a predetermined lapse time between layer applications to prevent slumping of the sealing material. The sealing composition may be sprayed atop a pre-applied encapsulation material used to cover individual fastener connections, or may be applied directly to abutting or overlapping surfaces requiring leak-proofing or leak repairs.

BRIEF DESCRIPTION OF THE DRAWINGS

FIG. 1 illustrates an interior section of a typical fluid containment tank, as well as the seal envisioned by the present invention, where two wall panels are secured together using fasteners and a stiffener panel;

FIG. 1a shows a top plan view of the two panels and the stiffener panel securing them together;

FIG. 2 depicts a cross-sectional view of the portion of the containment tank shown in FIG. 1a taken along section lines 2—2 in FIG. 1a; and FIG. 3 is a cross-sectional view similar to that of FIG. 2, but illustrating a modification of the fuel containment tank structure depicted in FIGS. 1, 1a, and 2, wherein the stiffener member is secured to, and supports, the spanning portion of a wall panel element.

DETAILED DESCRIPTION OF THE INVENTION

A. THE STRUCTURAL COMPONENTS OF THE FLUID CONTAINMENT TANK

Referring now to FIGS. 1, 1a, and 2, there is shown two wall panel components 12 and 14 of a fluid containment tank which have been joined end-to-end against the underside of a stiffener plate 22. Optionally, as shown in FIG. 3, a single wall panel component 12 may be provided with a backing or stiffener plate 22 of the type shown in FIG. 1. The latter situation may arise where support or reinforcement for the wall panel component is necessary, as for example where the wall panel components are subject to unusual structural loads or internal pressures. Typically, the stiffener plate 22 includes opposed flanges 23,23 against which the end regions 13 and 15 of the wall panel components are affixed with a plurality of fastener elements 32. Exemplary fastener elements are rivets, metal piercing threaded fasteners, bolts and nuts, etc.

Optimally for deflection control, where the stiffener plate is secured to two adjoining wall panel components, two rows of fasteners should be used at each flange. A single row of fasteners will suffice for a stiffener plate secured atop a single wall panel component.

In one embodiment of the invention, once the wall panel component(s) and the stiffener plate have been attached, a first sealing material is applied to the fasteners to provide an encapsulation thereof (as shown in FIGS. 1, 1a and 2), as well as along the edge of each stiffener plate flange adjacent a respective surface of an end region 13 or 15 in the form of a fillet 40.

In an alternative embodiment of the invention shown in FIG. 3, the stiffener plate is attached directly atop the wall panel component(s). Here, application of a first sealing material is not critical because there is no juncture of panel components which require sealing.

Thereafter, following assembly and attachment of the tank structural components, whether or not preliminarily sealed, a sealant composition, formulated in accordance with the present invention, is applied according to the method described below to produce the leakproof seal configuration embraced by the present invention.

B. THE METHOD OF APPLYING THE SEALANT COMPOSITION

The application of the sealant composition to the preassembled structural components of the fluid containment tank is accomplished by spraying, in a predetermined region on the components, a two-component polysulfide material (composed of a base and a catalyst), preferably diluted 65% with toluene solvent. One such polysulfide material which has been used is known in the industry as PR1750-A2 polysulfide. An improved polysulfide material which has also been used with excellent results is a product known as PR1770 Sprayable. Both products are obtainable from Products Research & Chemical Corporation, Woodland Hills, Calif.

Preferably, before treatment with the polysulfide material, the surfaces to be sprayed are abraded, after which an adhesion promotor is applied. The appropriately diluted sealant composition is then loaded into a spray gun and applied as a film or membrane consisting of a predetermined number of coats.

In FIGS. 1, 1a and 2, the membrane 100 is shown as being applied over the stiffener member 22, as well as the encapsulated fasteners and the preapplied fillets. FIG. 3 illustrates application of the membrane directly atop the preassembled structural components.

In accordance with the present invention, the membrane thickness should be greatest in the area of maximum deflection of the structural components, i.e., where the stiffener flange and the wall panel member overlap. Preferably, the sealant membrane tapers from a region of greatest thickness at the flange to a region of minimal thickness at a distance removed from the stiffener flange. Thus, a ramp-like structure is created which minimizes the erroding effects of slushing fuel in the tank.

To prevent slumping of the sealant composition during application to the structural components, it is necessary to insure that each successive coat is applied after a predetermined period of time has elapsed. In this manner, each applied coat is allowed to be partially air cured or dried to such an extent sufficient as to prevent slumping of that applied coat.

The following are examples of how the diluted sealant composition might be applied to the preassembled structural components shown in the various figures of the drawing to prevent slumping of the sealant composition during build-up of the desired thickness of membrane. In these examples, it is necessary to apply a predetermined number of coats of sealant composition to achieve the desired tapered coating or membrane configuration. Each coat is comprised of a series of passes, where one pass is a sweep of the spray applicator in a single direction over the components to be coated.

EXAMPLE I

In this example, a liquid mixture of the sealant composition is prepared by mixing PR1750-A2 polysulfide material with toluene solvent in a 65% dilution. Ten (10) coats of the sealant composition are applied, either atop previously-encapsulated structural components or directly on the metallic surfaces of previously-uncoated structural components, by spray application. The following chart illustrates the manner of application of the various coats and the time between application of successive coats:

| coat | passes | lapse time |
| --- | --- | --- |
| 1 | 20 | 25 minutes ± 5 minutes |
| 2 | 20 | 20 minutes ± 5 minutes |
| 3 | 20 | 20 minutes ± 5 minutes |
| 4 | 20 | 15 minutes ± 5 minutes |
| 5 | 20 | 15 minutes ± 5 minutes |
| 6 | 20 | 10 minutes ± 5 minutes |
| 7 | 20 | 10 minutes ± 5 minutes |
| 8 | 20 | 10 minutes ± 5 minutes |
| 9 | 20 | 5 minutes ± 5 minutes |
| 10 | 20 | 5 minutes ± 5 minutes |

EXAMPLE II

In this example, a dilution smaller than that of Example I (a dilution on the order of about 50%) of the mixture of toluene solvent and polysulfide material PR1770 Sprayable was applied to a jointed section of a fuel containment tank. Seven (7) coats of the sealant composition were applied, either atop previously-encapsulated structural components or directly on the metallic surfaces of previously-uncoated structural components, by spray application. The following chart illustrates the manner of application of the various coats and the time between each successive coat:

| coat | passes | lapse time |
| --- | --- | --- |
| 1 | 5 | 15 minutes ± 5 minutes |
| 2 | 5 | 10 minutes ± 5 minutes |
| 3 | 10 | 10 minutes ± 5 minutes |
| 4 | 20 | 10 minutes ± 5 minutes |
| 5 | 20 | 10 minutes ± 5 minutes |
| 6 | 20 | 5 minutes ± 5 minutes |
| 7 | 20 | 5 minutes ± 5 minutes |

While certain representative embodiments and details have been shown for the purpose of illustrating the invention, it will be apparent to those skilled in this art that various changes and modifications may be made therein without departing from the spirit or scope of this invention.

What I claim is:

1. A method of sealing the juncture of structural components from which a fluid-containment tank is fabricated, said method comprising:
   preparing a diluted mixture of a polysulfide material and a solvent, and
   depositing droplets of said mixture on surfaces of said structural components at and about said juncture on the interior surface of said tank to form a leakproof membrane, whereby
   the juncture and adjacent regions thereof are covered with a varying thickness, continuous, coherent layer of said mixture having maximum thickness in the vicinity of said juncture where the greatest structural deflections can occur and minimum thickness at a distance most remote from said juncture.

2. The method of claim 1, wherein
said step of depositing droplets of said mixture on said surfaces comprises atomizing said mixture and applying said atomized mixture to said surfaces in coats, the time required to apply each coat generally decreasing as the number of coats applied increases.

3. The method of claim 1, wherein
said step of depositing comprises spraying said mixture onto said surfaces in such a manner as to create a ramp of gradually decreasing height for minimizing the eroding effects of slushing fuel in the tank, the height of said ramp being greatest at a location where said layer has maximum thickness.

4. The method of claim 3, wherein
said step of spraying comprises applying a plurality of coats of said mixture to said surfaces, and allowing each of said applied coats to partially air cure before applying the next successive coat.

5. The method of claim 1, wherein
said step of preparing said mixture comprises diluting said polysulfide material with a toluene solvent.

6. The method of claim 1, wherein said step of preparing said mixture comprises formulating a solution including at least 65% of said polysulfide material by volume.

7. The method of claim 1, wherein said step of preparing said mixture comprises formulating a solution including at least 50% of said polysulfide material by volume.

8. A graduated thickness sealing membrane for preventing leakage of fluid from the interior of a fluid-containing tank through joint structures, said sealing membrane comprising:
a coherent continuous coating of sealant material formed by spraying and then at least partially curing each of a plurality of layers of a solvent-diluted mixture of the composition onto selected areas of surfaces of said joint structures,
said coating being deposited on the interior surfaces of the tank and delimiting a ramp for minimizing the eroding effects of slushing fluid and having a maximum thickness at the region of maximum deflection associated with said joint structures, and a minimum thickness at a region removed a predetermined distance from said region of maximum deflection.

9. The sealing membrane of claim 8, wherein said fluid is a fuel.

10. The sealing membrane of claim 8, wherein said fluid is a flammable fuel.

* * * * *